(12) United States Patent
Kim et al.

(10) Patent No.: US 9,954,941 B2
(45) Date of Patent: Apr. 24, 2018

(54) GLOBAL SERVER LOAD BALANCER APPARATUS AND METHOD FOR DYNAMICALLY CONTROLLING TIME-TO-LIVE

(71) Applicant: SAMSUNG SDS CO., LTD., Seoul (KR)

(72) Inventors: Sung-Il Kim, Seoul (KR); Sung-Duck Kim, Seoul (KR); Jin-Yeob Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 280 days.

(21) Appl. No.: 14/587,999

(22) Filed: Dec. 31, 2014

(65) Prior Publication Data
US 2016/0112500 A1 Apr. 21, 2016

(30) Foreign Application Priority Data
Oct. 21, 2014 (KR) .................. 10-2014-0142887

(51) Int. Cl.
| | |
|---|---|
| *H04L 29/08* | (2006.01) |
| *H04L 29/12* | (2006.01) |
| *H04L 12/24* | (2006.01) |
| *H04L 12/911* | (2013.01) |

(52) U.S. Cl.
CPC .... *H04L 67/1031* (2013.01); *H04L 29/12066* (2013.01); *H04L 41/0896* (2013.01); *H04L 47/822* (2013.01); *H04L 61/1511* (2013.01)

(58) Field of Classification Search
CPC ............. H04L 67/1002; H04L 67/1008; H04L 29/12066; H04L 61/1511; H04L 41/0896; H04L 47/822; H04L 47/125

USPC ........ 709/201, 202, 220, 221, 223, 224, 226
See application file for complete search history.

(56) References Cited

U.S. PATENT DOCUMENTS

| | | | | | |
|---|---|---|---|---|---|
| 7,877,493 | B2 * | 1/2011 | Quinlan | ............... | G06Q 10/107 709/206 |
| 8,296,373 | B2 * | 10/2012 | Bosworth | .............. | G06Q 10/10 709/206 |
| 2002/0087722 | A1 * | 7/2002 | Datta | ................ | H04L 29/12066 709/239 |
| 2004/0078487 | A1 * | 4/2004 | Cernohous | ........ | H04L 29/12009 709/245 |
| 2008/0276002 | A1 * | 11/2008 | Jiang | ....................... | H04L 45/00 709/241 |
| 2010/0011420 | A1 * | 1/2010 | Drako | .................. | G06Q 10/107 726/5 |
| 2010/0082787 | A1 * | 4/2010 | Kommula | ........... | H04L 67/1008 709/223 |

(Continued)

*Primary Examiner* — Edward Kim
(74) *Attorney, Agent, or Firm* — Sughrue Mion, PLLC (57) ABSTRACT

Disclosed are a global server load balancer (GSLB) apparatus and a method for dynamically controlling cache time-to-live (TTL) in the GSLB apparatus. The GSLB apparatus which performs load balancing among a plurality of local servers includes a domain name system (DNS) query processor that receives a query message from a DNS server, a server selector that selects a local server among the plurality of local servers based on the received query message, a load calculator that collects state information of the GSLB apparatus, and calculates a load of the GSLB apparatus from the collected state information, and a TTL controller that updates a TTL of the GSLB apparatus based on the calculated load.

13 Claims, 4 Drawing Sheets

(56) References Cited

U.S. PATENT DOCUMENTS

| | | | |
|---|---|---|---|
| 2010/0121932 A1* | 5/2010 | Joshi | H04L 67/1008 709/207 |
| 2010/0223378 A1* | 9/2010 | Wei | H04L 41/0896 709/224 |
| 2010/0223621 A1* | 9/2010 | Joshi | H04L 29/12066 718/105 |
| 2012/0096166 A1* | 4/2012 | Devarapalli | H04L 61/1511 709/226 |
| 2013/0073809 A1* | 3/2013 | Antani | G06F 12/121 711/136 |
| 2013/0227099 A1* | 8/2013 | Hinton | H04L 41/00 709/223 |
| 2014/0229606 A1* | 8/2014 | Griswold | H04L 41/069 709/224 |

* cited by examiner

GLOBAL SERVER LOAD BALANCER APPARATUS AND METHOD FOR DYNAMICALLY CONTROLLING TIME-TO-LIVE

CROSS-REFERENCE TO RELATED APPLICATION

This application claims priority to Korean Patent Application No. 10-2014-0142887, filed on Oct. 21, 2014, the disclosure of which is incorporated herein by reference in its entirety.

BACKGROUND

1. Field

The present disclosure relates to technology for controlling time-to-live (TTL) in a global server load balancer.

2. Discussion of Related Art

In content delivery network (CDN) services for constructing a disaster recovery (DR) site to overcome local difficulties of a data center and improving transmission costs and transmission speed, a global server load balancer (GSLB) is a key technical element that is essentially used.

In an existing GSLB, an operator sets cache time-to-live (TTL) in advance, and in this case, there is a problem that, even if a domain name system (DNS) record is changed due to occurrence of a fault in a site, a delay may occur by a maximum TTL time until a corresponding change is propagated to a final user. To address this problem, a method that sets TTL to be significantly small or to be even zero may be considered. However, in this case, rapid propagation of a situation concerning the change in the DNS record or the like is possible, but in proportion thereto, the number of requests which come in the GSLB is also increased, and therefore the GSLB becomes unable to respond to the requests in an extreme case. Therefore, there are demands for a method that adjusts TTL to an optimal value within the level for satisfying stability of the GSLB and service quality standard.

SUMMARY

The present disclosure is directed to a method for dynamically changing a magnitude of cache time-to-live (TTL) set in a global server load balancer (GSLB) based on the state of the GSLB.

According to an aspect of the present disclosure, there is provided a global server load balancer (GSLB) apparatus which performs load balancing among a plurality of local servers, comprising, a domain name system (DNS) query processor configured to receive a query message from a DNS server; a server selector configured to select a local server among the plurality of local servers based on the received query message;

a load calculator configured to collect state information of the GSLB apparatus, and to calculate a load of the GSLB apparatus from the collected state information; and a cache time-to-live (TTL) controller configured to update a TTL value of the GSLB apparatus based on the calculated load, wherein the DNS query processor is further configured to transmit a response message including information about the local server selected in the server selector and the updated TTL value to the DNS server.

The state information of the GSLB apparatus may include at least one from among a central processing unit (CPU) use rate, a memory use rate, auxiliary storage device input/ output (I/O) quantity, network I/O quantity of the GSLB apparatus, and an amount of received query messages per unit time.

The TTL controller may update the TTL value so that the updated TTL value is in a range between a predetermined maximum value and a predetermined minimum value, the TTL value being increased when the load exceeds a threshold value, and the TTL value being decreased when the load is less than or equal to the threshold value.

An initial TTL value may be set as the predetermined maximum value.

When the load exceeds the threshold value, the TTL controller may update the TTL value to a value between the predetermined maximum value, the intermediate value being between the TTL value and an intermediate value of the predetermined maximum value and a previous TTL value.

When the load is equal to or less than the threshold value, the TTL controller may update the TTL value to a value between the predetermined minimum value of the TTL value and a value obtained by subtracting a predetermined reduction value from a previous TTL value.

According to another aspect of the present disclosure, there is provided a method for controlling a TTL value which is performed in a GSLB apparatus for performing load balancing among a plurality of local servers, the method comprising, receiving a query message from a DNS server, selecting a local server from the plurality of local servers, collecting state information of the GSLB apparatus and calculating a load of the GSLB apparatus from the collected state information, updating a TTL value of the GSLB apparatus based on the calculated load, and transmitting a response message including information about the selected local server and the updated TTL value to the DNS server.

The state information of the GSLB apparatus may include at least one from among a CPU use rate, a memory use rate, auxiliary storage device input/output (I/O) quantity, network I/O quantity of the GSLB apparatus, and an amount of received query messages per unit time.

The updating of the TTL value may include updating the TTL value so that the updated TTL value is in a range between a predetermined maximum value and a predetermined minimum value, the TTL value being increased when the load exceeds a threshold value, and the TTL value being decreased when the load is less than or equal to the threshold.

An initial TTL value may be set as the predetermined maximum value.

When the load exceeds the threshold value, the updating of the TTL value may include updating the TTL value to a value between the predetermined maximum value, the intermediate value being between the TTL value and an intermediate value of the predetermined maximum value and a previous TTL value.

When the load is equal to or less than the threshold value, the updating of the TTL value may include updating the TTL value to a value between the predetermined minimum value of the TTL value and a value obtained by subtracting a predetermined reduction value from a previous TTL value.

According to still another aspect of the present disclosure, there is provided a computer program which is combined with hardware and stored in a non-transitory computer readable recording medium, the program configured to execute, receiving a query message from a DNS server, selecting a local server from a plurality of local servers, collecting state information of a GSLB apparatus and calculating a load of the GSLB apparatus from the collected state information, updating a TTL value of the GSLB apparatus based on the calculated load, and transmitting a response message including information about the selected local server and the updated TTL value to the DNS server.

BRIEF DESCRIPTION OF THE DRAWINGS

The above and other objects and features of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present disclosure will be described in detail. However, the present disclosure is not limited to the exemplary embodiments disclosed below, but can be implemented in various forms. The following exemplary embodiments are described in order to enable those of ordinary skill in the art to embody and practice the disclosure.

When it is determined that the detailed description of known art related to the present disclosure may obscure the gist of the present disclosure, the detailed description thereof will be omitted. The same reference numerals are used to refer to the same element throughout the specification. Terminology described below is defined considering functions in the present disclosure and may vary according to a user's or operator's intention or usual practice. Thus, the meanings of the terminology should be interpreted based on the overall context of the present specification.

The terminology used herein is for the purpose of describing particular embodiments only and is not intended to be limiting of the extent of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
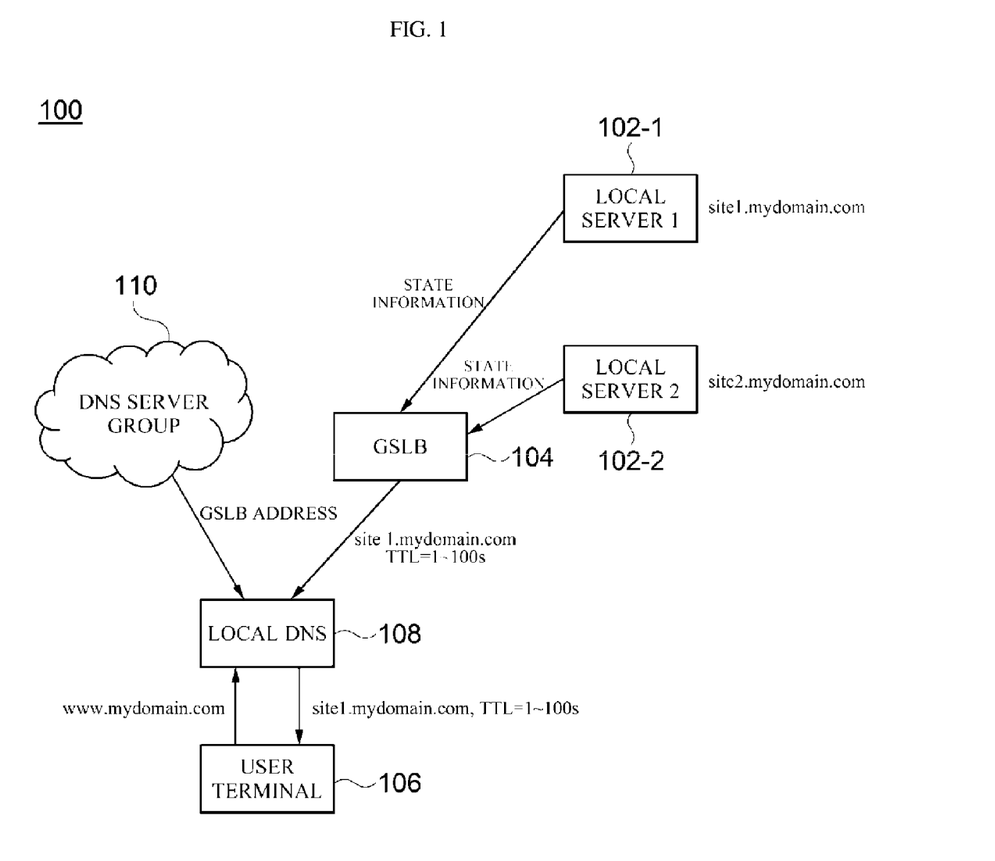
FIG. 1 is a block diagram illustrating a web service system including a global server load balancer (GSLB) apparatus according to an example embodiment of the present disclosure.

FIG. 1 is a block diagram illustrating a web service system 100 including a global server load balancer (GSLB) apparatus according to an example embodiment of the present disclosure. Referring to FIG. 1, the web service system 100 according to an example embodiment of the present disclosure includes a plurality of local servers 102-1 and 102-2 and a GSLB apparatus 104.

The local servers 102-1 and 102-2 are servers which provide web services to a user terminal 106, and may be configured so as to be present at different geographic locations while including the same contents. For example, the local server 102-1 may be present in Asia, and the local server 102-2 may be present in the America. Two local servers are shown in the illustrated embodiment. However, it is merely exemplary and the number of local servers may be appropriately set in consideration of a local range of web services, the number of users for each region, and the like.

In an example embodiment, the local servers 102-1 and 102-2 have respective connection addresses. In a case of the illustrated embodiment, a connection address (URL) representing the entire web service may be set as www.mydomain.com, a connection address of the local server 102-1 may be set as site1.mydomain.com, and a connection address of the local server 102-2 may be set as site2.mydomain.com.

The GSLB apparatus 104 is connected to each of the local servers 102-1 and 102-2, and performs load balancing between the local servers 102-1 and 102-2. In an example embodiment, the GSLB apparatus 104 may be a concept including an authority domain name system (DNS) apparatus in which mapping information about a domain and an Internet protocol (IP) address is registered.

The GSLB apparatus 104 periodically collects and stores state information from each of the local servers 102-1 and 102-2. The state information may be a load of each of the local servers 102-1 and 102-2 (for example, a central processing unit (CPU) use rate, a memory use rate, auxiliary storage device input/output (I/O) quantity, network I/O quantity, the number of connected users, and the like), a failure of each of the local servers 102-1 and 102-2, or the like.

When receiving a DNS query from a local DNS server 108 connected to the user terminal 106, the GSLB apparatus 104 selects one local server from the local servers 102-1 and 102-2 in consideration of the collected state information of each of the local servers 102-1 and 102-2, a geographical distance between the local DNS server 108 and each of the local servers 102-1 and 102-2, a network hop count between the local DNS server 108 and each of the local servers 102-1 and 102-2, a policy set in advance by an operator of the web service system 100, and the like, and transmits a DNS response including connection information (network address) of the selected local server to the local DNS server 108.

In an example embodiment, the DNS response may further include a time-to-live (TTL) value. The TTL value is a period in which the local DNS server 108 and the user terminal 106 store the connection information of the local server in a cache memory. For example, the local DNS server 108 and the user terminal 106 store the connection information of the local server in the cache memory during the TTL when receiving the DNS response, and respond to a DNS request for the same domain (www.mydomain.com) using the result stored in the cache memory when receiving the DNS request during the TTL. When the TTL has elapsed, the connection information of the local server stored in the cache memory is deleted, and the subsequent DNS request is processed by the GSLB apparatus 104 in the same manner as in the above described example.

As described above, when the TTL value is received from the GSLB apparatus 104, the local DNS server 108 does not transmit the DNS query to the GSLB apparatus 104 during the TTL. Thus, an amount of the DNS queries that should be processed by the GSLB apparatus 104 can be changed based on a TTL value. For example, as the TTL increases, the amount of the DNS queries transmitted to the GSLB apparatus 104 from each of the local DNS servers 108 decreases. However, when the TTL excessively increases, it becomes difficult to immediately reflect a state change in each of the local servers 102-1 and 102-2 in the GSLB apparatus 104. For example, even when a failure occurs in the local server 102-1 immediately after the connection information of the local server 102-1 is stored in the cache memory of the local DNS server 108, the local DNS server 108 provides the connection information of the local server 102-1 still stored in the cache memory to the user terminal 106 during TTL, and a connection transition due to the failure becomes delayed.

Conversely, as the TTL decreases, the GSLB apparatus 104 may immediately reflect the state change in each of the local servers 102-1 and 102-2, thereby balancing load balancing the local servers 102-1 and 102-2. When a failure occurs in the local server 102-1 in the same manner as in the above described example, the GSLB apparatus 104 may redirect the user terminal 106 to the local server 102-2 side by providing the connection information of the local server 102-2 rather than that of the local server 102-1 in which the failure occurs. However, when the TTL value excessively decreases, the number of the requests coming in the GSLB apparatus 104 increases, and therefore a failure of the GSLB apparatus 104 can occur due to an abnormal increase in the traffic (for example, a denial of service (DOS) attack, etc.).

Thus, in embodiments of the present disclosure, the GSLB apparatus 104 may reflect a load of the GSLB apparatus 104 itself and the amount of the in-coming DNS queries to dynamically adjust the TTL value, thereby appropriately controlling the load of the GSLB apparatus 104, and at the same time, efficiently performing load distribution between the local servers 102-1 and 102-2.

The user terminal 106 is a device that is connected to one of the local servers 102-1 and 102-2 to receive web services. The user terminal 106 may include any type of user equipment in which a network connection is possible such as a desktop computer, a laptop computer, a mobile phone, a tablet computer, and the like.

In an example embodiment, the user terminal 106 transmits, to the local DNS server 108, a DNS query including a domain (for example, www.mydomain.com) of a web service which is desired to be connected to. Next, the local DNS server 108 determines a connection address of the GSLB apparatus 104 corresponding to the received domain through a DNS server group 110 that belongs to a DNS system, and requests connection information corresponding to the domain from the GSLB apparatus 104 using the determined connection address. Next, the GSLB apparatus 104 selects one of the local servers 102-1 and 102-2 as described above, and transmits connection information and the TTL of the selected server to the DNS server 108. Next, the local DNS server 108 provides a DNS response including the received information to the user terminal 106. Next, the user terminal 106 is connected to one of the local servers 102-1 and 102-2 based on the received information to receive a corresponding web service.

Figure 2:
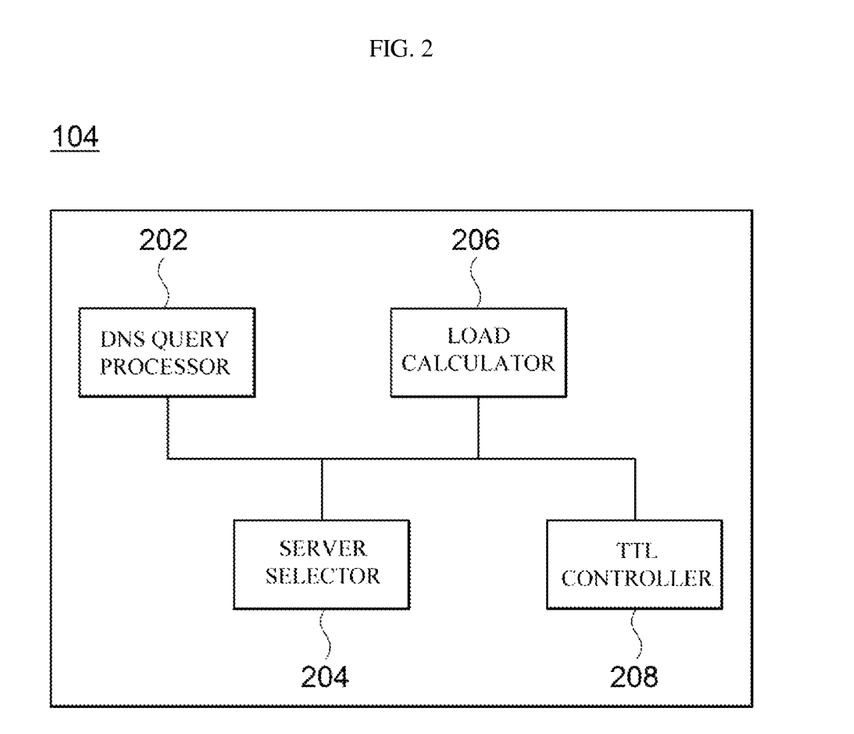
FIG. 2 is a block diagram illustrating a detailed configuration of a GSLB apparatus according to an example embodiment of the present disclosure.

FIG. 2 is a block diagram illustrating a detailed configuration of the GSLB apparatus 104 according to an example embodiment of the present disclosure. The GSLB apparatus 104 according to an example embodiment is an apparatus for performing load balancing among a plurality of local servers, and includes a DNS query processor 202, a server selector 204, a load calculator 206, and a TTL controller 208 as shown in FIG. 2. In an embodiment, the DNS query processor, the server selector, the load calculator, and the TTL controller, are implemented via at least one CPU or at least one hardware processor.

The DNS query processor 202 is configured to receive a query message from the local DNS server 108, and to transmit a response message to the query message to the local DNS server 108. The response message includes connection information of a local server in the server selector 204 which will be described later, and a TTL value updated in the TTL controller 208.

The server selector 204 is configured to select, based on the received query message, one local server of a plurality of local servers 102-1 and 102-2 connected to the GSLB apparatus 104. As described above, the server selector 204 may periodically collect state information of each of the local servers 102-1 and 102-2 and select one local server from the plurality of local servers 102-1 and 102-2 in consideration of the collected state information.

The load calculator 206 is configured to collect state information of the GSLB apparatus 104, and to calculate a load of the GSLB apparatus 104 from the collected state information. The load may refer to a measure of the amount of computational work that a computer system performs. The state information of the GSLB apparatus 104 may be a central processing unit (CPU) use rate of the GSLB apparatus 104, a memory use rate, auxiliary storage device input/output (I/O) quantity, network I/O quantity, or a received amount of DNS query messages per unit time. The load calculator 206 may reflect at least one from among the above-described state information to calculate a load of the GSLB apparatus 104. For example, the load calculator 206 may normalize each of the state information and combine the normalized information based on a predetermined weight, thereby calculating the load.

The TTL controller 208 is configured to update a TTL value of the GSLB apparatus 104 based on the load calculated in the load calculator 206.

In an example embodiment, the TTL controller 208 may set a maximum value TTLmax of the TTL value and a minimum value TTLmin with respect to a domain for which a TTL value is to be set, and update the TTL value so that the updated TTL value is in a range between the maximum value and the minimum value. For example, the TTL controller 208 may set the maximum value TTLmax as an initial value of the TTL value when the GSLB apparatus 104 initially starts up. That is, the TTL controller 208 starts to respond to the DNS query that is initially received after the start-up of the GSLB apparatus 104, with the maximum value TTLmax, and thereafter, subtracts from the TTL value based on the state of the GSLB apparatus 104. In an exemplary embodiment, after the subtracting from the TTL value, there may be adding to the TTL value based on the state of the GSLB apparatus 104.

Specifically, the TTL controller 208 may increase the TTL value when the load of the GSLB apparatus 104 exceeds a predetermined threshold value, and decrease the TTL value when the load is equal to or less than the threshold.

In an example embodiment, the TTL value may be decreased linearly. For example, when the load is the threshold value or less upon the reception of the query message in the DNS query processor 202, the TTL controller 208 may update the TTL value (TTLcurrent) as a value between 1) a minimum value TTLmin of the TTL and 2) a value obtained by subtracting a predetermined reduction value from the previous TTLcurrent. This may be represented as the following Equation 1.

$$TTL_{current} = \max(TTL_{min}, TTL_{current} - k) \quad \text{[Equation 1]}$$

In this instance, k denotes a reduction value of TTL value.

On the other hand, the TTL value may be increased exponentially (exponential backoff). For example, when the load calculated in the load calculator 206 exceeds the threshold value upon the reception of the query message in the DNS query processor 202, the TTL controller 208 may update the TTL value (TTLcurrent) as a value between 1) a maximum value TTLmax of the TTL and 2) an intermediate value of the maximum value TTLmax and the previous TTLcurrent.

The increase of the TTL value relates to a case in which the load of the GSLB apparatus 104 exceeds the threshold value. Therefore, by increasing the TTL value in exponential fashion, it is possible to rapidly stabilize the GSLB apparatus before a failure of the GSLB apparatus 104 occurs.

The above-described condition may be represented as the following Equation 2.

$$TTL_{current} = \min\left(TTL_{max}, \frac{TTL_{current} + TTL_{max}}{2}\right) \quad \text{[Equation 2]}$$

When only an integer value is allowed as the TTL according to embodiments, the TTL controller 208 may set the TTL as the integer value by truncating or rounding off the decimal places of the TTL calculated by Equation 2.

In the present disclosure, the GSLB apparatus 104 may respond with a value between the minimum value TTLmin and the maximum value TTLmax based on the state of the GSLB apparatus 104 rather than responding with the fixed TTL value, and therefore, the number of users who experience the failure may be efficiently dropped compared to the related art, and at the same time, the load of the GSLB apparatus 104 may be maintained at an appropriate level. In an embodiment, the various elements of apparatus 104 are implemented via a CPU, hardware processor, or other computing device including further electronic hardware.

Figure 3:
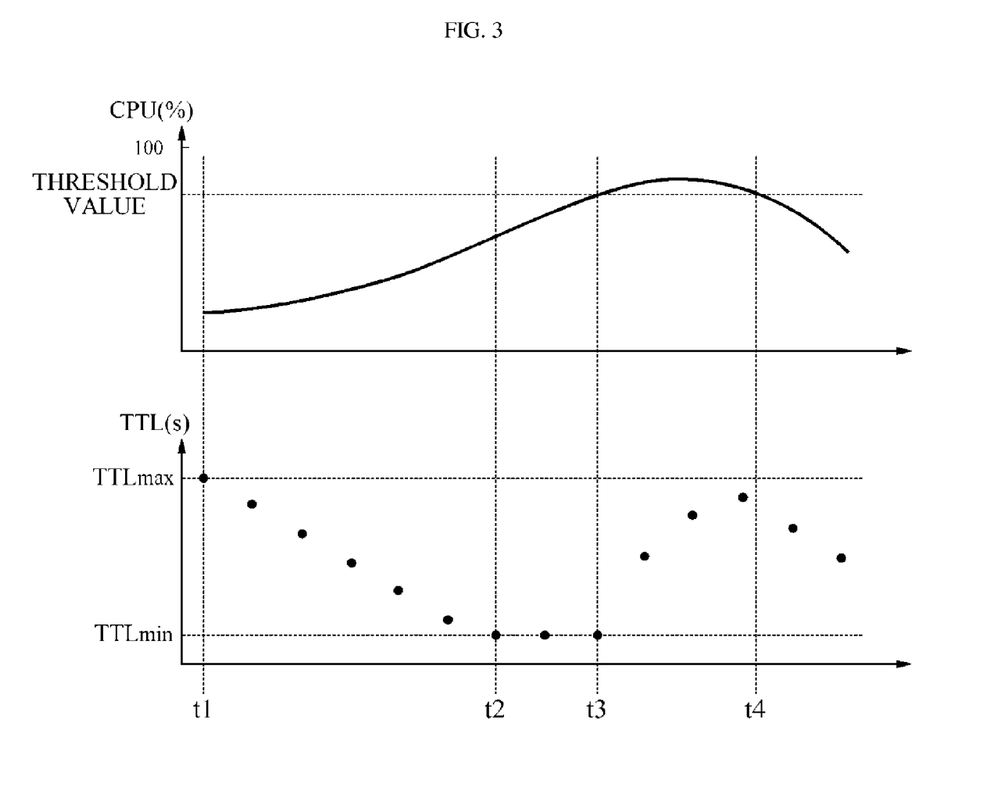
FIG. 3 is a diagram illustrating a process for controlling time-to-live (TTL) in a TTL controller according to an example embodiment of the present disclosure.

FIG. 3 is a diagram illustrating a process for controlling TTL value in the TTL controller 208 according to an example embodiment of the present disclosure. In an upper graph of FIG. 3, a change in the load of the GSLB apparatus 104 calculated from a start-up time $t_1$ of the GSLB apparatus 104 is shown, and in a lower graph of FIG. 3, a decrease and an increase in the TTL value according to the change in the load are shown.

First, at the start-up time $t_1$ of the GSLB apparatus 104, the TTL value is set as a maximum value TTLmax. In an interval up to a time $t_2$, the load of the GSLB apparatus 104 is equal to or less than a threshold value, and therefore the TTL value is decreased linearly, and a minimum value TTLmin is maintained in an interval of $t_2$ to $t_3$.

Next, in an interval of $t_3$ to $t_4$, the load of the GSLB apparatus 104 exceeds the threshold value, and therefore the TTL controller 208 increases the TTL value in a manner of an exponential function. Next, in an interval after $t_4$, the load of the GSLB apparatus 104 is the threshold value or less, and therefore the TTL value is decreased linearly again.

Figure 4:
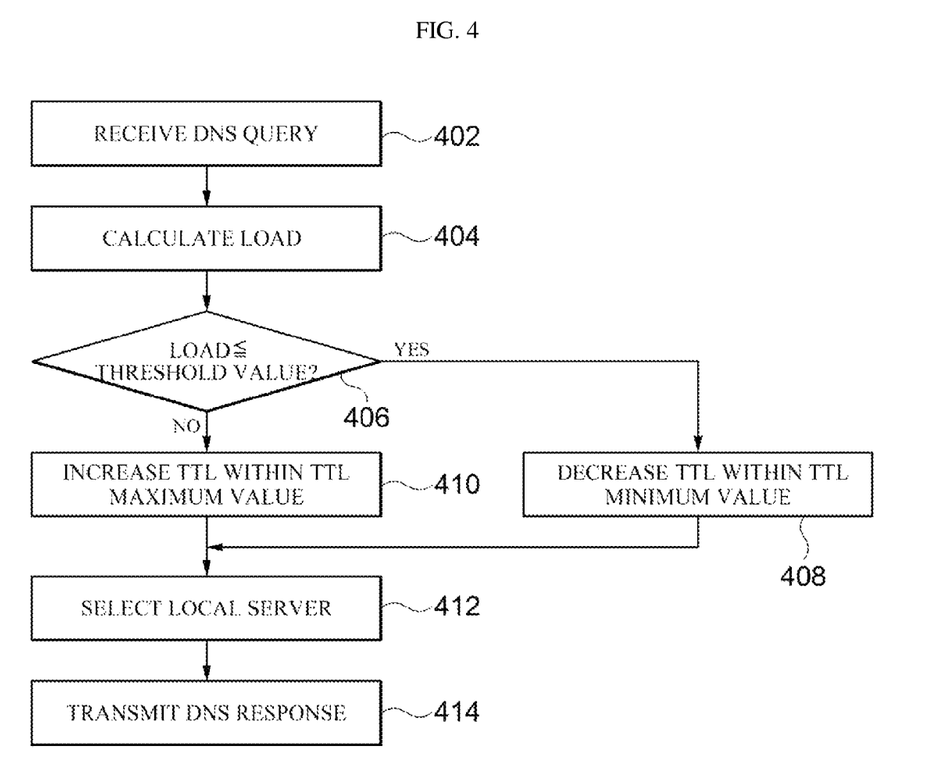
FIG. 4 is a flowchart illustrating a method for dynamically controlling a TTL in a GSLB apparatus according to an example embodiment of the present disclosure.

FIG. 4 is a flowchart illustrating a method 400 for dynamically controlling a TTL value in the GSLB apparatus 104 according to an example embodiment of the present disclosure.

In operation 402, the DNS query processor 202 receives a query message from the local DNS server 108.

In operation 404, the load calculator 206 collects state information of the GSLB apparatus 104, and calculates a load of the GSLB apparatus 104 from the collected state information.

In operation 406, the TTL controller 208 determines whether the load is a threshold value or less by comparing the calculated load and the threshold value.

In operation 408, when the load is determined to be equal to or less than the threshold value, the TTL controller 208 decreases the TTL value within a range that does not exceed a predetermined minimum value.

In operation 410, when the load is determined to exceed the threshold value based on the determination result of operation 406, the TTL controller 208 increases the TTL value within a range that does not exceed a predetermined maximum value. Detailed description of the reduction and increase in the TTL value has been described above.

In operation 412, the server selector 204 selects any one local server from a plurality of local servers 102-1 and 102-2.

In operation 414, the DNS query processor 202 transmits a response message including information about the selected local server and the updated TTL value to the local DNS server 108.

As described above, according to the embodiments of the present disclosure, by dynamically changing the TTL value based on the load of the GSLB apparatus, the TTL value may be minimized to a level for satisfying stability and service quality standard of the GSLB apparatus.

The methods according to various embodiments of the present disclosure may be implemented in the form of software readable by various computer means and recorded in a non-transitory computer-readable recording medium. The non-transitory computer-readable recording medium may separately include program commands, local data files, local data structures, etc. or include a combination of them. The medium may be specially designed and configured for the present disclosure, or known and available to those of ordinary skill in the field of computer software. Examples of the computer-readable recording medium include magnetic media, such as a hard disk, a floppy disk, and a magnetic tape, optical media, such as a CD-ROM and a DVD, magneto-optical media, such as a floptical disk, and hardware devices, such as a ROM, a RAM, and a flash memory, specially configured to store and perform program commands. Examples of the program commands may include high-level language codes executable by a computer using an interpreter, etc. as well as machine language codes made by compilers.

It will be apparent to those skilled in the art that various modifications can be made to the above-described exemplary embodiments of the present disclosure without departing from the spirit or scope of the disclosure. Thus, it is intended that the present disclosure covers all such modifications provided they come within the scope of the appended claims and their equivalents.

What is claimed is:

1. A global server load balancer (GSLB) apparatus which performs load balancing among a plurality of local servers, comprising:
   a domain name system (DNS) query processor that receives a query message from a DNS server;
   a server selector that collects state information of the plurality of local servers, and selects a local server among the plurality of local servers based on the received query message and the collected state information of the plurality of local servers;

a load calculator that collects state information of the GSLB apparatus, and calculates a load of the GSLB apparatus from the collected state information of the GSLB apparatus; and a time-to-live (TTL) controller that updates a TTL value of the GSLB apparatus based on the calculated load, wherein the DNS query processor, the server selector, the load calculator, and the TTL controller, are implemented via at least one central processing unit (CPU) or at least one hardware processor, and wherein the DNS query processor transmits a response message including information about the local server selected in the server selector and the updated TTL value, to the DNS server.

2. The apparatus of claim 1, wherein the state information of the GSLB apparatus comprises at least one from among CPU use rate, a memory use rate, auxiliary storage device input/output (I/O) quantity, network I/O quantity, and an amount of received query messages per unit time.

3. The apparatus of claim 1, wherein, the TTL controller updates the TTL value so that the updated TTL value is in a range between a predetermined maximum value and a predetermined minimum value, the TTL value being increased when the load exceeds a threshold value, and the TTL value being decreased when the load is less than or equal to the threshold value.

4. The apparatus of claim 3, wherein an initial TTL value is set as the predetermined maximum value.

5. The apparatus of claim 3, wherein, when the load exceeds the threshold value, the TTL controller updates the TTL value to a value between the predetermined maximum value of the TTL value and an intermediate value, the intermediate value being between the predetermined maximum value and a previous TTL value.

6. The apparatus of claim 3, wherein, when the load is equal to or less than the threshold value, the TTL controller updates the TTL value to a value between the predetermined minimum value of the TTL value and a value obtained by subtracting a predetermined reduction value from a previous TTL value.

7. A method for controlling a time-to-live (TTL) value which is performed in a global server load balancer (GSLB) apparatus for performing load balancing among a plurality of local servers, the method comprising:

receiving a query message from a domain name system (DNS) server;

collecting state information of the plurality of local servers;

selecting a local server from the plurality of local servers based on the received query message and the collected state information of the plurality of local servers;

collecting state information of the GSLB apparatus and calculating a load of the GSLB apparatus from the collected state information of the GSLB apparatus;

updating a TTL value of the GSLB apparatus based on the calculated load; and transmitting a response message comprising information about the selected local server and the updated TTL value, to the DNS server.

8. The method of claim 7, wherein the state information of the GSLB apparatus comprises at least one from among a central processing unit (CPU) use rate, a memory use rate, auxiliary storage device input/output (I/O) quantity, network I/O quantity, and an amount of received query messages per unit time.

9. The method of claim 7, wherein the updating of the TTL value comprises:

updating the TTL value so that the updated TTL value is in a range between a predetermined maximum value and a predetermined minimum value, the TTL value being increased when the load exceeds a threshold value and the TTL value being decreased when the load is less than or equal to the threshold value.

10. The method of claim 9, wherein an initial TTL value is set as the predetermined maximum value.

11. The method of claim 9, wherein, when the load exceeds the threshold value, the updating of the TTL value comprises updating the TTL value to a value between the predetermined maximum value of the TTL value and an intermediate value, the intermediate value being between the predetermined maximum value and a previous TTL value.

12. The method of claim 9, wherein, when the load is equal to or less than the threshold value, the updating of the TTL value comprises updating the TTL value to a value between the predetermined minimum value of the TTL and a value obtained by subtracting a predetermined reduction value from a previous TTL value.

13. A non-transitory computer readable recording medium having recorded thereon a computer program adapted to enable a hardware processor of a computer system to execute:

receiving a query message from a domain name system (DNS) server;

collecting state information of a plurality of local servers;

selecting a local server from the plurality of local servers based on the received query message and the collected state information of the plurality of local servers;

collecting state information of a global server load balancer (GSLB) apparatus and calculating a load of the GSLB apparatus from the collected state information of the GSLB apparatus;

updating a time-to-live (TTL) value of the GSLB apparatus based on the calculated load; and transmitting a response message comprising information about the selected local server and the updated TTL value to the DNS server.

* * * * *